(12) United States Patent
Kim et al.

(10) Patent No.: US 12,495,789 B2
(45) Date of Patent: Dec. 16, 2025

(54) ULTRASONIC GENERATOR AND METHOD FOR REPELLING MOSQUITO IN VEHICLE USING THE SAME

(71) Applicants: Hyundai Motor Company, Seoul (KR); Kia Corporation, Seoul (KR)

(72) Inventors: Ki Chang Kim, Gyeonggi-do (KR); Dong Chul Park, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 252 days.

(21) Appl. No.: 17/988,656

(22) Filed: Nov. 16, 2022

(65) Prior Publication Data
US 2023/0380409 A1   Nov. 30, 2023

(30) Foreign Application Priority Data

May 30, 2022   (KR) .......................... 10-2022-0066194

(51) Int. Cl.
*A01M 29/18*   (2011.01)
*E05F 15/70*   (2015.01)
(52) U.S. Cl.
CPC .............. *A01M 29/18* (2013.01); *E05F 15/70* (2015.01); *E05Y 2400/44* (2013.01); *E05Y 2400/45* (2013.01); *E05Y 2900/55* (2013.01)
(58) Field of Classification Search
None
See application file for complete search history.

(56) References Cited

U.S. PATENT DOCUMENTS

| 4,150,637 A | * | 4/1979 | Penick | ................. | A01M 29/18 |
| | | | | | 280/727 |
| 6,301,194 B1 | * | 10/2001 | Cauchy | ................. | A01M 29/18 |
| | | | | | 119/719 |
| 2006/0023158 A1 | * | 2/2006 | Howell | ................. | G02C 11/06 |
| | | | | | 351/41 |

(Continued)

FOREIGN PATENT DOCUMENTS

| CN | 2583986 Y | * | 11/2002 |
| CN | 113229269 A | * | 8/2021 |
| KR | 20-1993-0007956 U | | 5/1993 |

(Continued)

OTHER PUBLICATIONS

Ahmad, Aqeel, Bhadriraju Subramanyam, and Ludek Zurek. "Responses of mosquitoes and German cockroaches to ultrasound emitted from a random ultrasonic generating device." Entomologia experimentalis et applicata 123.1 (2007): 25-33. (Year: 2007).*

(Continued)

*Primary Examiner* — Isam A Alsomiri
*Assistant Examiner* — Jonathan D Armstrong
(74) *Attorney, Agent, or Firm* — Fox Rothschild LLP

(57) ABSTRACT

An ultrasonic generator and a method for repelling a mosquito in a vehicle using the same are provided. The ultrasonic generator may include a sensor device that is configured to sense a mosquito in a vehicle, an ultrasonic vibrator device that may be configured to output an ultrasonic signal for repelling the mosquito, and a controller that controls the ultrasonic vibrator device and controls a first window, chosen among a plurality of windows of the vehicle, to be opened such that the mosquito is repped out of the first window.

16 Claims, 21 Drawing Sheets

(56) References Cited

U.S. PATENT DOCUMENTS

2023/0380408 A1* 11/2023 Kim .................. A01M 29/18
2024/0397934 A1* 12/2024 Kim .................. A01M 29/18

FOREIGN PATENT DOCUMENTS

| KR | 200201026 Y1 | 11/2000 |
| KR | 100818364 B1 | 4/2008 |
| KR | 200490387 Y1 | 11/2019 |
| KR | 10-2022-0013805 A | 2/2022 |
| KR | 10-2023-0163780 A | 12/2023 |

OTHER PUBLICATIONS

Salim, Zaid T., et al. "Frequency-based detection of female Aedes mosquito using surface acoustic wave technology: Early prevention of dengue fever." Microelectronic Engineering 179 (2017): 83-90. (Year: 2017).*

* cited by examiner

ULTRASONIC GENERATOR AND METHOD FOR REPELLING MOSQUITO IN VEHICLE USING THE SAME

CROSS-REFERENCE TO RELATED APPLICATION

This application claims under 35 U.S.C. § 119(a) the benefit of and priority to Korean Patent Application No. 10-2022-0066194, filed in the Korean Intellectual Property Office on May 30, 2022, the entire contents of which are incorporated herein by reference.

BACKGROUND

1. Technical Field

The present disclosure relates to an ultrasonic generator and a method for repelling a mosquito in a vehicle using the same, and more particularly, relates to technologies capable of repelling a mosquito in the vehicle out of the vehicle.

2. Background

Technologies for repelling pests using a natural frequency that the pests hate have been proposed. For example, a mosquito repelling method for repelling a mosquito using an ultrasonic wave having a specific frequency has been proposed.

However, conventional methods for repelling mosquitoes using ultrasonic waves have a limit to an ability to kill or repel mosquitoes.

Particularly, it is more difficult to repel a mosquito using an ultrasonic wave in the vehicle which has a wide space capable of hiding mosquitoes from the ultrasonic wave having straightness.

Furthermore, it is difficult for a mosquito repelling area to cover the entire interior of the vehicle due to the straightness of the ultrasonic wave. Thus, a large number of ultrasonic vibrators should be installed to cover the entire interior area of the vehicle.

SUMMARY

The present disclosure has been made to address the above-mentioned problems occurring in the prior art while advantages achieved by the prior art are maintained intact.

An aspect of the present disclosure provides an ultrasonic generator for effectively repelling a mosquito in a vehicle and a method for repelling a mosquito in a vehicle using the same.

Another aspect of the present disclosure provides an ultrasonic generator for repelling a mosquito over a wider area and a method for repelling a mosquito in a vehicle using the same.

Another aspect of the present disclosure provides an ultrasonic generator for not degrading the performance of repelling a mosquito while covering a wide area and a method for repelling a mosquito in a vehicle using the same.

The technical problems to be addressed by the present disclosure are not limited to the aforementioned problems, and any other technical problems not mentioned herein will be clearly understood from the following description by those skilled in the art to which the present disclosure pertains.

According to an aspect of the present disclosure, an ultrasonic generator may include a sensor device that senses a mosquito in a vehicle, an ultrasonic vibrator device that outputs an ultrasonic signal for repelling the mosquito, and a controller that controls the ultrasonic vibrator device and controls a first window, chosen among a plurality of windows of the vehicle, for repelling the mosquito out of the first window.

According to an embodiment, the ultrasonic vibrator device may include a first ultrasonic vibrator and a second ultrasonic vibrator that output ultrasonic waves having different frequencies.

According to an embodiment, the controller may further control the ultrasonic vibrator device such that a frequency range output by the ultrasonic vibrator device is swept.

According to an embodiment, the ultrasonic generator may further include a motor that rotates the ultrasonic vibrator device if activated by the controller.

According to an embodiment, the sensor device may transmit an ultrasonic signal for sensing a presence and location of the mosquito, and may sense the presence and location of the mosquito based on a pattern of a reflection signal of the ultrasonic signal transmit by the sensing device.

According to an embodiment, the controller may select the first window based on which window of the plurality of windows of the vehicle is closest to a location of a passenger of the vehicle.

According to an embodiment, the controller may select the first window based on which window of the plurality of the windows of the vehicle is closest to the location of the mosquito.

According to an embodiment, the controller may control a second window of the plurality of the windows of the vehicle to be opened if a distance between the mosquito and the first window is greater than or equal to a threshold distance.

According to an embodiment, the second window is located in a direction opposite to the first window.

According to an embodiment, the controller may control the ultrasonic vibrator device to transmit a secondary ultrasonic wave, before opening the first window and after opening the second window.

According to an embodiment, the ultrasonic generator may further include a display that provides a notification of an operation state of the ultrasonic vibrator device.

According to an embodiment, the controller may control a speaker for in-vehicle use to output a sound source signal of a predetermined audible frequency while the ultrasonic vibrator device outputs an ultrasonic signal.

According to an embodiment, the controller may control a display in the vehicle to display a location of the mosquito sensed by the sensor device.

According to another aspect of the present disclosure, a method for repelling mosquitoes in a vehicle may include sensing, by a sensor device, a mosquito in a vehicle, transmitting, by an ultrasonic vibrator device, a primary ultrasonic wave based on the sensing of the mosquito step, and opening, by a controller, a first window, chosen among a plurality of windows of the vehicle, for repelling the mosquito out of the vehicle.

According to an embodiment, the sensing of the mosquito in the vehicle may include transmitting, by the sensor device, an ultrasonic signal for sensing a presence and a location of the mosquito, receiving, by the sensor device, a reflection signal of the ultrasonic signal transmit by the sensor device, and sensing, by the sensor device, the presence and the location of the mosquito based on a pattern of the reflection signal.

According to an embodiment, the opening of the first window step may further include determining a location of a passenger in the vehicle and selecting the first window by excluding a window, chosen among the plurality of windows of the vehicle, closest to the location of the passenger.

According to an embodiment, the opening of the first window may include determining a location of the mosquito and selecting the first window based on which window of the plurality of the windows of the vehicle is closest to the mosquito.

According to an embodiment, the opening of the first window step may further include opening a second window of the plurality of the windows of the vehicle if a distance between the mosquito and the first window is greater than or equal to a threshold distance.

According to an embodiment, the second window is located in a direction opposite to the first window.

According to an embodiment, the method may further include transmitting a secondary ultrasonic wave, before opening the first window and after opening the second window.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
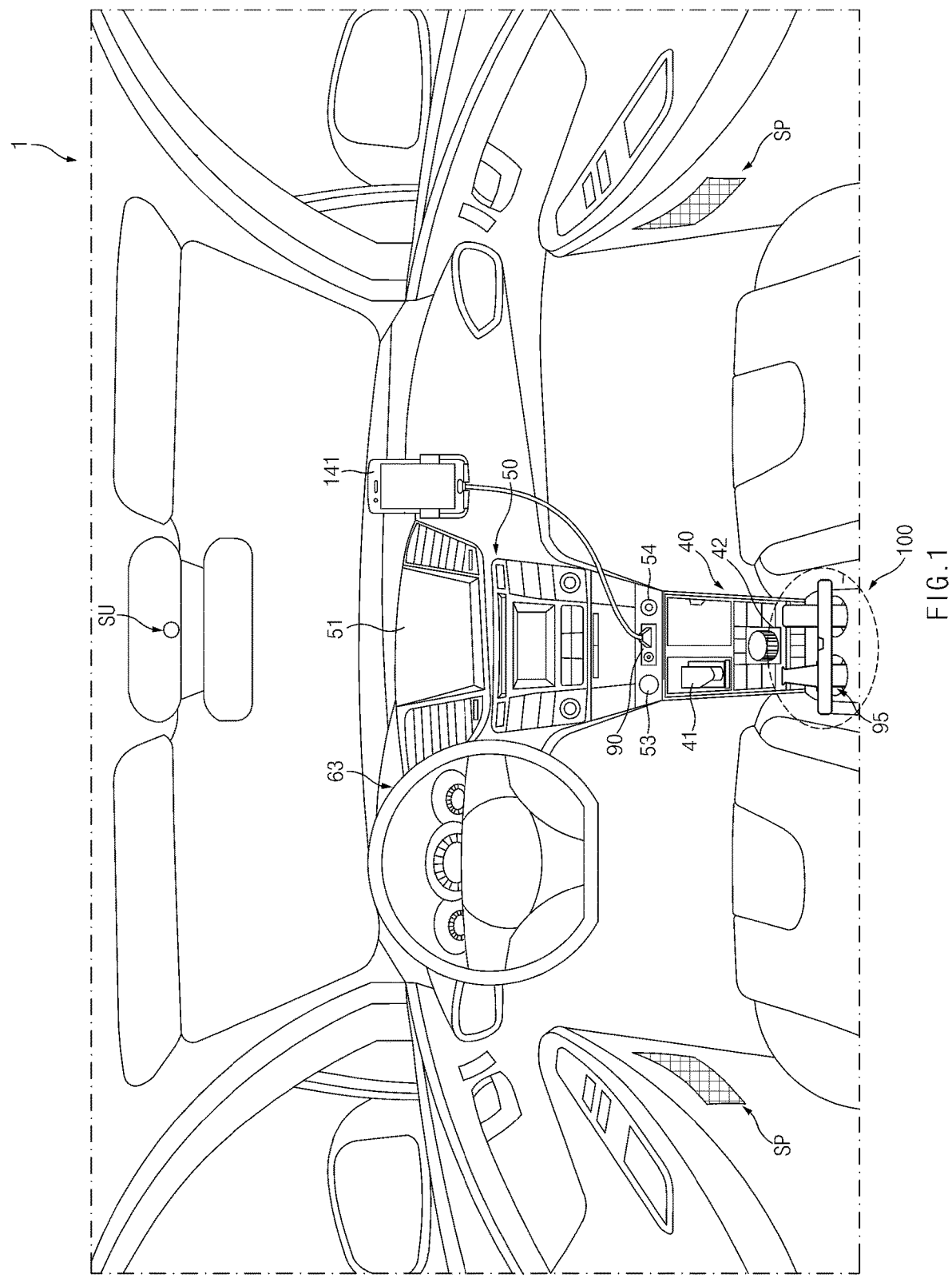
FIG. 1 is a drawing illustrating a pest control system using an ultrasonic generator and a vehicle according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure will be described in detail with reference to FIGS. 1 to 19.

FIG. 1 is a drawing illustrating an embodiment of a vehicle loaded with an ultrasonic generator according to an embodiment of the present disclosure.

Referring to FIG. 1, an ultrasonic generator 100 according to an embodiment of the present disclosure may be implemented in a portable form to be mounted on a cup holder 95 of a vehicle 1.

The vehicle 1 may include a dashboard in which a gearbox 40, a center fascia 50, a steering wheel 63, and the like are provided.

The gearbox 40 may include a shift gear 41 for shifting the vehicle 1. Furthermore, the gearbox 40 may provide a space in which a dial manipulation part 42 is installed. A user may control a navigation device 51 or a main function of the vehicle 1 by means of the dial manipulation part 42.

The center fascia 50 may include an outlet, a clock, an audio device 52, a display 51, and the like. The outlet may transmit the flow of air controlled by an air conditioning device to the inside of the vehicle 1 to adjust a temperature, humidity, air cleanliness, and the like in the vehicle 1. The center fascia 50 may include a button or a dial for controlling the air conditioning device. The display 51 of the center fascia 50 may display various images output by an audio video navigation (AVN) device of the vehicle 1. The display 51 may be implemented as a liquid crystal display (LCD) panel, an organic light emitting diode (OLED) panel, or the like.

The steering wheel 63 may control wheels 61 and 62. In addition, the steering wheel 63 may adjust a driving direction of the vehicle 1.

According to an embodiment, the dashboard may include various gauge panels capable of displaying a driving speed, an engine RPM, a remaining amount of fuel, or the like of the vehicle 1, a globe box capable of receiving various things, and the like.

Furthermore, a USB port 90 which connects a storage medium access device with the AVN device or the like of the vehicle 1 may be installed in the center fascia 50 of the dashboard.

The AVN device refers to a terminal capable of providing the user with an audio and video function in an integrated manner as well as providing the user with a navigation function for providing a route to a destination. The AVN device may display various control screens associated with control of the vehicle 1 or a screen associated with an additional function capable of being executed in the AVN device as well as selectively displaying at least one of an audio screen, a video screen, or a navigation screen on the display 51.

The AVN device may be connected with the storage medium access device through the USB port 90. The storage medium may include portable storage media such as a USB memory and a memory card (e.g., a smart media card (SMC), a compact flash (CF) card, a memory stick, a secure digital (SD) card, or a multimedia card (MMC)). Furthermore, the storage medium capable of accessing the access device may include a magnetic storage medium (e.g., a read-only memory (ROM), a floppy disk, a hard disk, or the like), an optical medium (e.g., a compact disc-read-only memory (CD-ROM), a digital versatile disc (DVD), or the like), and an electronic device the above-mentioned portable storage medium accesses. Herein, the electronic device may include a computer, a laptop, a digital camera, a smartphone, an MP3 player, a portable multimedia player (PMP), a game console, or the like, which may access the magnetic storage medium, the optical medium, and the portable storage medium.

Furthermore, the vehicle 1 may further include a speaker capable of transmitting a multimedia sound source. The speaker may transmit a predetermined sound source to the user, while the ultrasonic generator 100 operates.

A sensor device SU may sense a mosquito in the vehicle 1. Furthermore, the sensor device SU may determine a location of the sensed mosquito. Hereinafter, a description will be given of the sensor device SU using an ultrasonic sensor in an embodiment of the present disclosure. Thus, the sensor device SU is referred to as an ultrasonic sensor.

FIG. 1 illustrates an embodiment in which the ultrasonic sensor SU is implemented independently of the ultrasonic generator 100, but the ultrasonic sensor SU may be integrally implemented with the ultrasonic generator 100.

Figure 2:
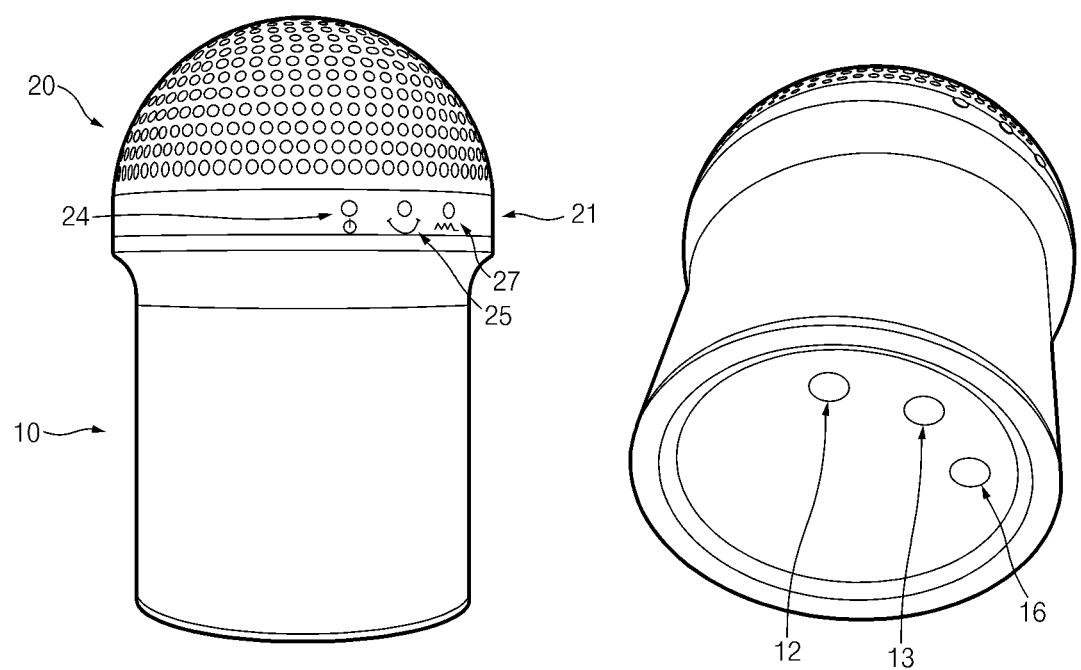
FIG. 2 is a drawing illustrating an embodiment of an ultrasonic generator according to an embodiment of the present disclosure.
Figure 3:
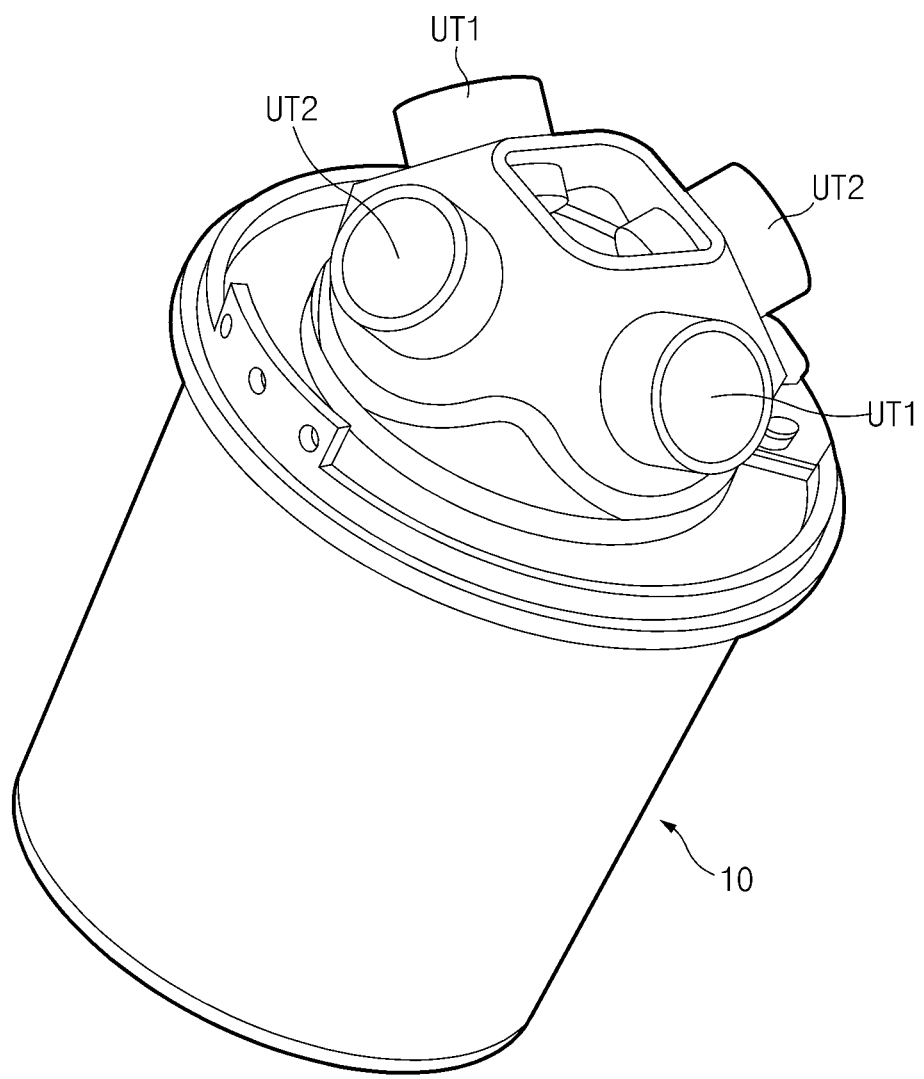
FIG. 3 is a drawing illustrating a structure except for a cover of an ultrasonic generator.
Figure 4:
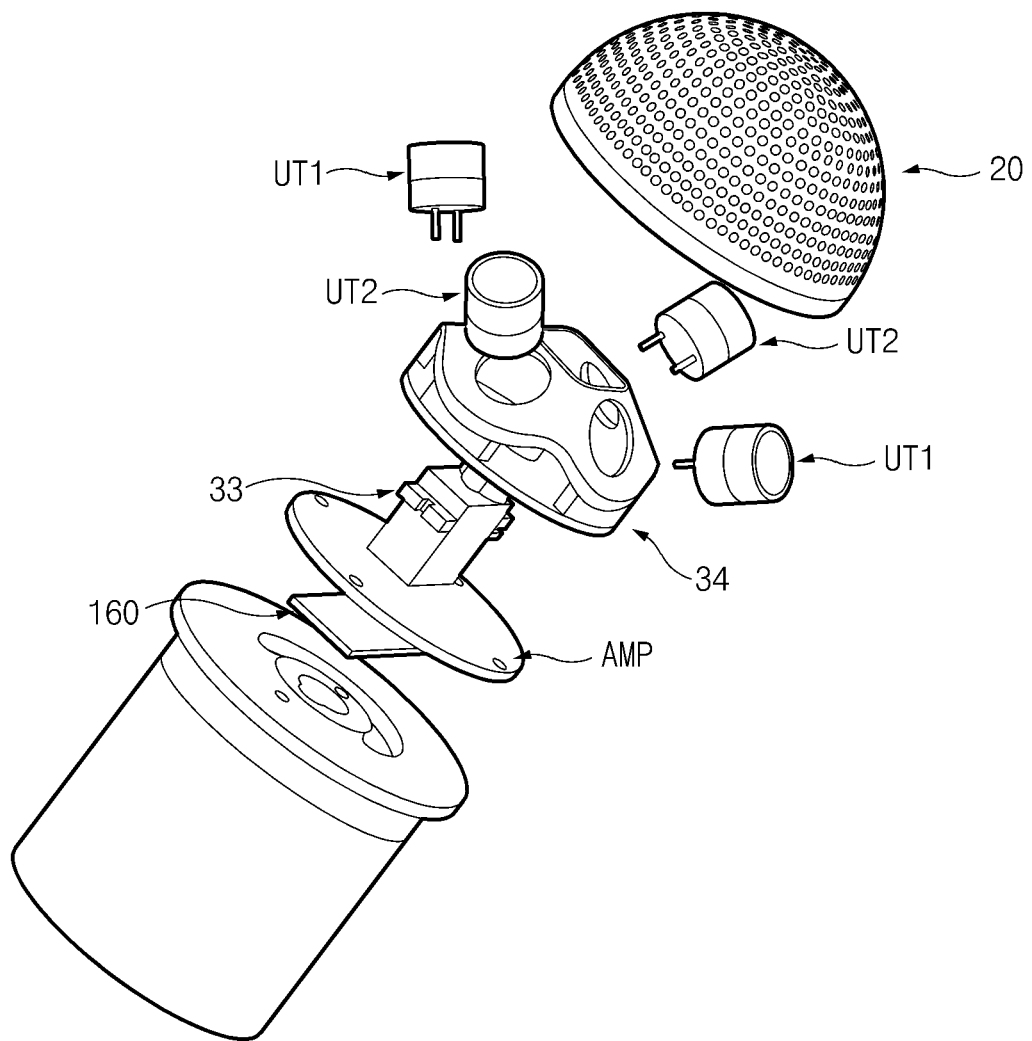
FIG. 4 is a drawing illustrating an exploded perspective view of an ultrasonic generator.

FIG. 2 is a drawing illustrating an embodiment of an ultrasonic generator according to an embodiment of the present disclosure. FIG. 3 is a drawing illustrating a structure except for a cover of an ultrasonic generator shown in FIG. 2. FIG. 4 is a drawing illustrating an exploded perspective view of an ultrasonic generator.

Referring to FIGS. 2 to 4, an ultrasonic generator 100 of FIG. 1 may be implemented in the form of a portable multifunction machine capable of being received in a cup holder 95 of a vehicle 1, which may include a body part 10 and a cover 20.

Figure 5:
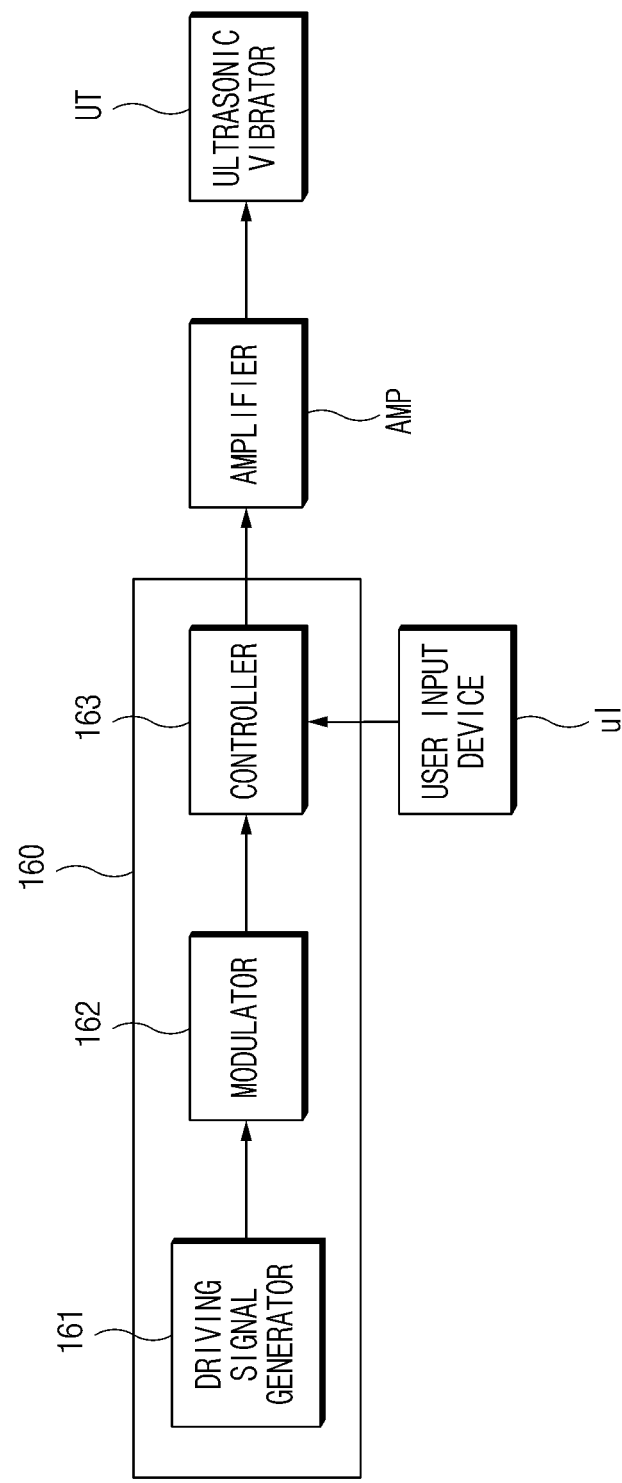
FIG. 5 is a block diagram illustrating a configuration of a circuit part.

The body part 10 may support the overall configuration of the ultrasonic generator 100 and may provide a space loaded with a circuit part 160 or the like shown in FIG. 5. The body part 10 may be implemented in the form of a cylindrical box such that it may be easily inserted into the cup holder 95.

User input parts 12, 13, and 16 may be foiled at an external side of the body part 10, for example, in a lower portion of the body part 10. The user input parts 12, 13, and 16 may be implemented in the form of a button and may be formed in plural to separately control a specific operation. For example, the user input parts 12, 13, and 16 may include the power button 12 for turning on/off an operation of the ultrasonic generator 100, the rotation selection button 13 for controlling an operation of a motor 33 shown in FIG. 4, a waveform selection button 16 for controlling a vibration waveform of an ultrasonic wave, or the like.

The cover 20 may be coupled to the body part 10, and a plurality of holes may be formed in the cover 20 such that a transmission signal generated by an ultrasonic vibrator UT may be transmitted to the outside.

A power input part 140 and operation display parts 24, 25, and 27 may be formed at an external side of the cover 20. The power input part 140 may be a universal serial bus (USB) socket. The operation display parts 24, 25, and 27 may display operation states of the ultrasonic generator 100, which may be implemented as a plurality of light-emitting diodes (LEDs). For example, the operation display parts 24, 25, and 27 may include the power LED 24 for providing a notification that the power source is turned on, a motor LED 25 for displaying an operation state of the motor 33, and a waveform LED 27 for displaying an ultrasonic vibration state.

The circuit part 160, an amplifier AMP, a motor 33, a first ultrasonic vibrator UT1, and a second ultrasonic vibrator UT2 may be included in the cover 20.

The circuit part 160 may be implemented as a printed circuit board (PCB). The amplifier AMP may be electrically connected with the circuit part 160 to amplify a modulation signal generated by the circuit part 160.

The motor 33 may rotate a rotary plate 34 based on control of the circuit part 160.

The first and second ultrasonic vibrators UT1 and UT2 may generate ultrasonic waves based on amplified signals provided from the amplifier AMP.

The first ultrasonic vibrator UT1 and the second ultrasonic vibrator UT2 may output ultrasonic waves having different frequencies. A first frequency output by the first ultrasonic vibrator UT1 and a second frequency output by the second ultrasonic vibrator UT2 may be frequencies for repelling a mosquito. The first and second ultrasonic vibrators UT1 and UT2 may be coupled to the rotary plate 34 to adjust an ultrasonic transmission direction depending on the rotation of the rotary plate 34.

The first and second ultrasonic vibrators UT1 and UT2 may be divided into a magnetostrictive vibrator, a piezoelectric vibrator, or the like depending on a vibration generation principle.

The magnetostrictive vibrator may use a coil wound on ferrite or the like which is a magnetic body. The magnetostrictive vibrator may resonate with a natural frequency depending on an applied current to generate an ultrasonic wave in a direction perpendicular to a magnetic field.

The piezoelectric vibrator may use a piezoelectric effect for converting a mechanical stress into a charge, which may be implemented in a simple structure. A piezoelectric body may generate a longitudinal wave or a shear wave depending on a cut form. After the piezoelectric body is polarized, an AC voltage may be applied to the piezoelectric body to repeat expansion and contraction. The piezoelectric vibrator may output an ultrasonic wave based on the vibration of the piezoelectric body.

FIG. 5 is a block diagram illustrating a configuration of a circuit part.

Referring to FIG. 5, a circuit part 160 may include a driving signal generator 161, a modulator 162, and a controller 163.

The driving signal generator 161 may generate a driving signal for driving an ultrasonic vibrator UT. The driving signal generator 161 may use an oscillator or the like.

The modulator 162 may modulate an amplitude of the driving signal to generate a modulation signal. The modulator 162 may modulate amplitude to adjust a parameter of a frequency carrier of the driving signal and may increase the output efficiency of the ultrasonic vibrator UT. The modulator 162 may modulate an amplitude of a carrier depending on an amplitude of analog data. According to an embodiment, the modulator 162 may use a double side band (DSB) scheme, a single side band (SSB) scheme, a vestigial side band (VSB) scheme, and a composite scheme in which the SSB scheme and the DSB scheme are mixed.

Figure 6:
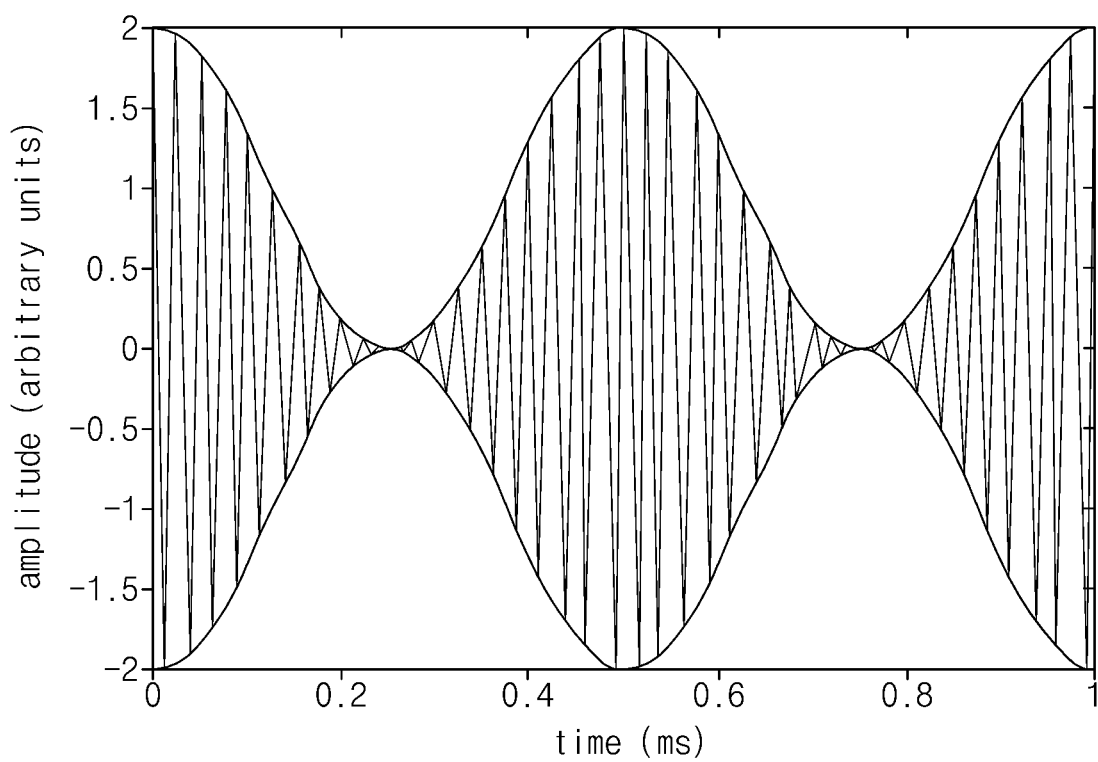
FIG. 6 is a drawing illustrating DSB modulation.

FIG. 6 is a drawing illustrating DSB modulation.

A modulator 162 of FIG. 5 may modulate a driving signal in a DSB scheme which simultaneously transmits an upper side band (USB) and a lower side band (LSB) on a spectrum.

A double side band-suppressed carrier (DSB-SC) scheme in which a carrier is not included in a modulated wave or a double side band-large carrier (DSB-LC) scheme in which a carrier is included in a modulated wave may be used as the DSB scheme.

Figure 7:
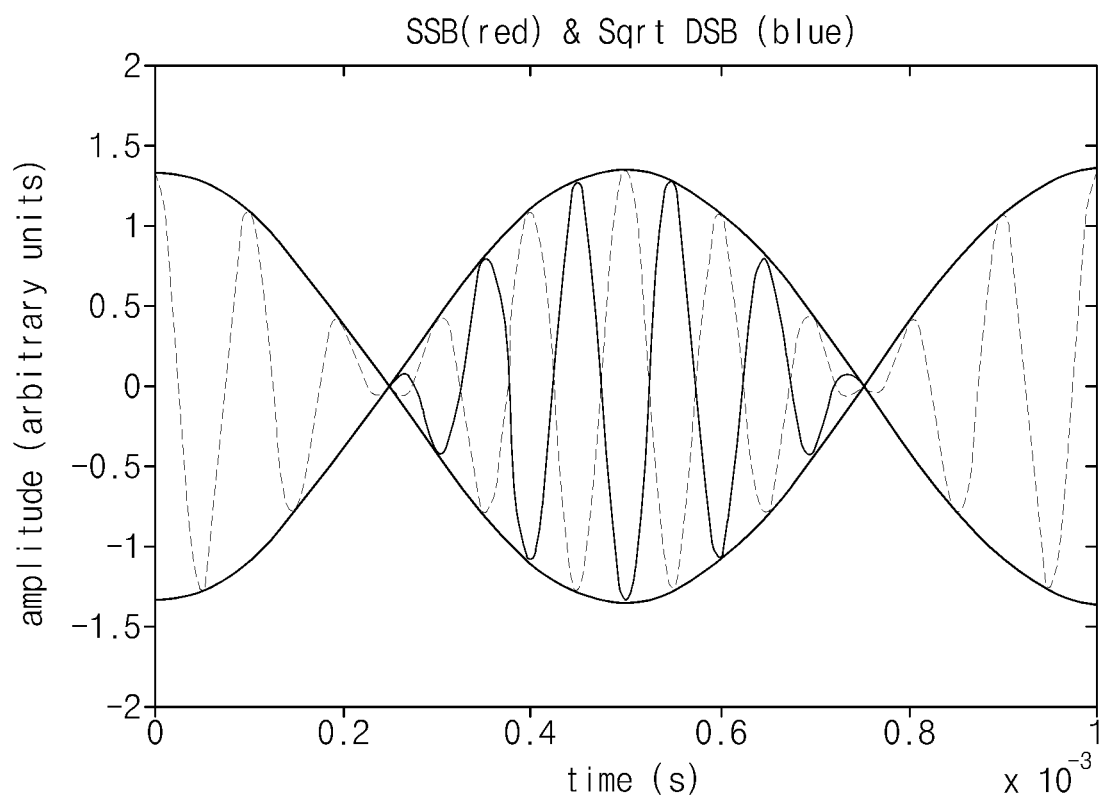
FIG. 7 is a drawing illustrating a waveform obtained by mixing DSB modulation and SSB modulation according to an embodiment of the present disclosure.

FIG. 7 is a drawing illustrating a waveform obtained by mixing DSB modulation and SSB modulation according to an embodiment of the present disclosure.

A modulator 162 of FIG. 5 may perform primary modulation of a driving signal in an SSB scheme and may perform secondary modulation using a DSB scheme as shown in FIG. 6 to generate a modulation signal modulated in a composite scheme shown in FIG. 7.

A controller 163 of FIG. 5 may adjust output timings of modulation signals to determine an ultrasonic output pattern. According to an embodiment of the present disclosure, the controller 163 may adjust output timings of modulation signals such that an output duration of each of the modulation signals is included at least once in a unit duration.

Furthermore, after transmitting an ultrasonic wave by means of an ultrasonic vibrator UT of FIG. 5, the controller 163 may control a first window for repelling a mosquito out of the vehicle to be opened.

Furthermore, while the ultrasonic vibrator UT outputs an ultrasonic signal, the controller 163 may operate a speaker SP for in-vehicle use in FIG. 1 to output a sound source signal of a predetermined audible frequency.

Furthermore, the controller 163 may control a display 51 of FIG. 1 in the vehicle to display a location of the mosquito sensed by an ultrasonic sensor SU of FIG. 1.

To this end, the controller 163 may communicate with a control module which controls the display 51 in the vehicle or the speaker SP through short-range communication or wired communication and may transmit a request to control the display 51 or the speaker SP to the control module.

To adjust the output timings of the modulation signals, the controller 163 may identify a mosquito type corresponding to the location information. The location information may be information indicating a location of the ultrasonic generator 100, which may be obtained based on a global positioning system (GPS). To this end, the ultrasonic generator 100 may further include a GPS receiver or may obtain location information from the outside.

An appearing mosquito type corresponding to the location information may be stored in a database in advance as shown in Table 1 below.

TABLE 1

| GPS coordinates (x, y) | Appearing mosquitoes |
| --- | --- |
| (x1, y1) | Mosquito A, mosquito B |
| (x2, y2) | Mosquito C |
| (x3, y3) | Mosquito D |
| ... | ... |

Referring to Table 1 above, an appearing mosquito may be matched and stored with coordinates represented by (latitude, longitude) in the database.

The controller 163 may identify a killing frequency matched with the mosquito type. To this end, the database may store killing frequency information corresponding to the appearing mosquito as shown in Table 2 below.

TABLE 2

| Appearing mosquitoes | Killing frequencies |
| --- | --- |
| Mosquito A | f1 |
| Mosquito B | f2 |
| Mosquito C | f3 |
| ... | ... |

As a result, the controller 163 may select a killing frequency corresponding to the location information and may control an ultrasonic output to output killing frequencies. For example, the controller 163 may select f1 and f2 as killing frequencies, when the location information is (x1, y1), and may select f3 as the killing frequency, when the location information is (x2, y2).

According to an embodiment, when there is a killing frequency which is not supported by the ultrasonic generator 100 among the killing frequencies corresponding to the pieces of location information or when the killing frequency for repelling the appearing mosquito corresponding to the location information is not set, the controller 163 may control an output timing of an ultrasonic signal using a sweep pattern for sweeping within a range of certain frequencies. The output timing of the ultrasonic signal may be a procedure for adjusting the output timing of the modulation signal output by the modulator 162.

Figure 8:
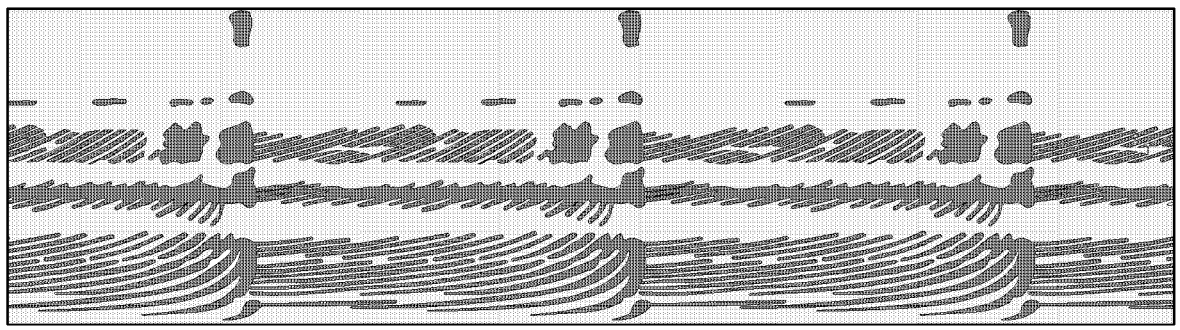
FIG. 8 is a drawing illustrating an ultrasonic output by a sweep pattern.

FIG. 8 is a drawing illustrating an ultrasonic output by a sweep pattern.

A controller 163 of FIG. 5 may control a sweep mode such that each of a plurality of killing frequencies is output at least once during a predetermined unit duration. The controller 163 may repel various mosquitoes by means of an ultrasonic output mode of the sweep pattern as shown in FIG. 8.

According to an embodiment, the controller 163 may focus on repelling a specific mosquito by focusing on transmitting a killing frequency for the specific mosquito. For example, when the location information is (x1, y1), the controller 163 may focus on outputting f1 and f2 as killing frequencies. When f1 is a first frequency and f2 is a second frequency, the controller 163 may drive a first ultrasonic vibrator UT1 for outputting a first ultrasonic signal of the first frequency and a second ultrasonic vibrator UT2 for outputting a second ultrasonic signal of the second frequency at least once during the unit duration.

According to an embodiment, the controller 163 may adjust output timings such that timings when the first ultrasonic signal and the second ultrasonic signal are output do not overlap with each other, thus reducing interference between the first ultrasonic signal and the second ultrasonic signal.

Figure 9:
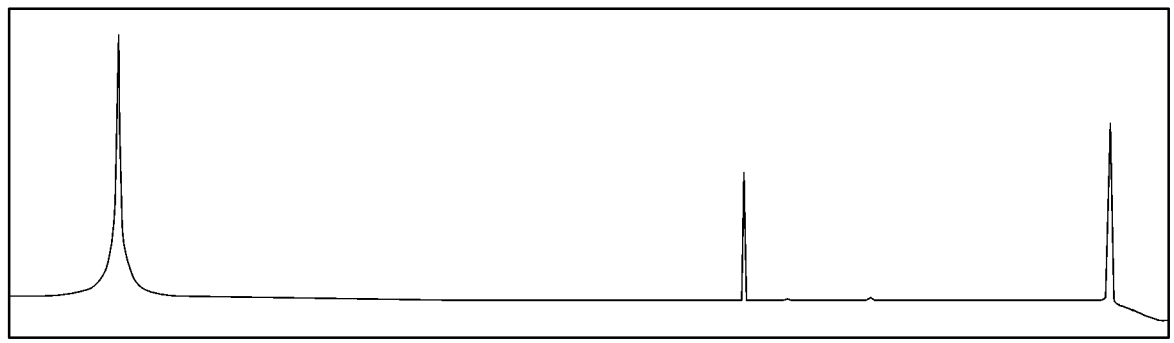
FIG. 9 is a drawing illustrating an ultrasonic output by a killing pattern.

FIG. 9 is a drawing illustrating an ultrasonic output by a killing pattern.

A controller 163 of FIG. 5 may focus on repelling a specific mosquito by means of a killing pattern shown in FIG. 9.

Figure 10:
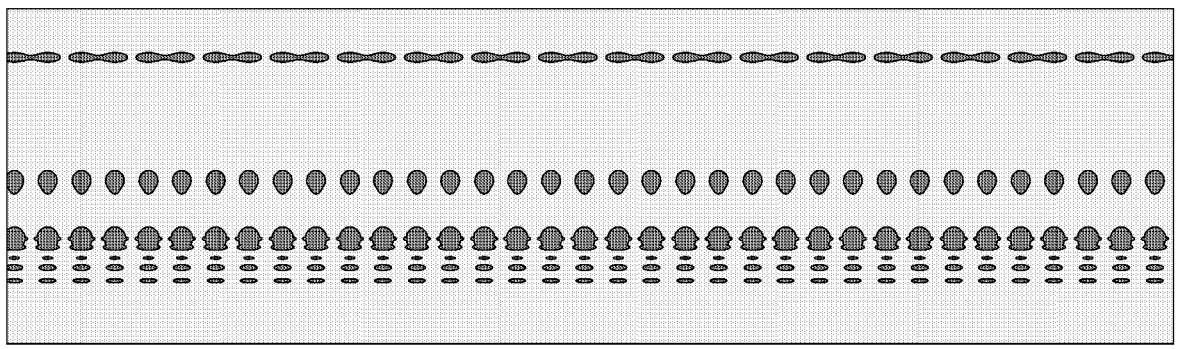
FIG. 10 is a drawing illustrating a hybrid pattern obtained by mixing a sweep pattern and a killing pattern.

FIG. 10 is a drawing illustrating a hybrid pattern obtained by mixing a sweep pattern and a killing pattern.

As shown in FIG. 9, a controller 163 of FIG. 5 may control output timings of ultrasonic signals such that a first frequency and a second frequency are alternately output at the same as sweeping a range of the first frequency and the second frequency within a unit duration.

The controller 163 may prevent approaching of various mosquitoes, while focusing on repelling a specific mosquito by mixing a sweep pattern with a killing pattern shown in FIG. 10.

As such, the controller 163 may proceed with artificial intelligence learning by using location information and an appearing mosquito as input values and may adjust an output timing of a modulation signal output by a modulator 162 of FIG. 5 based on the learned result.

Figure 11:
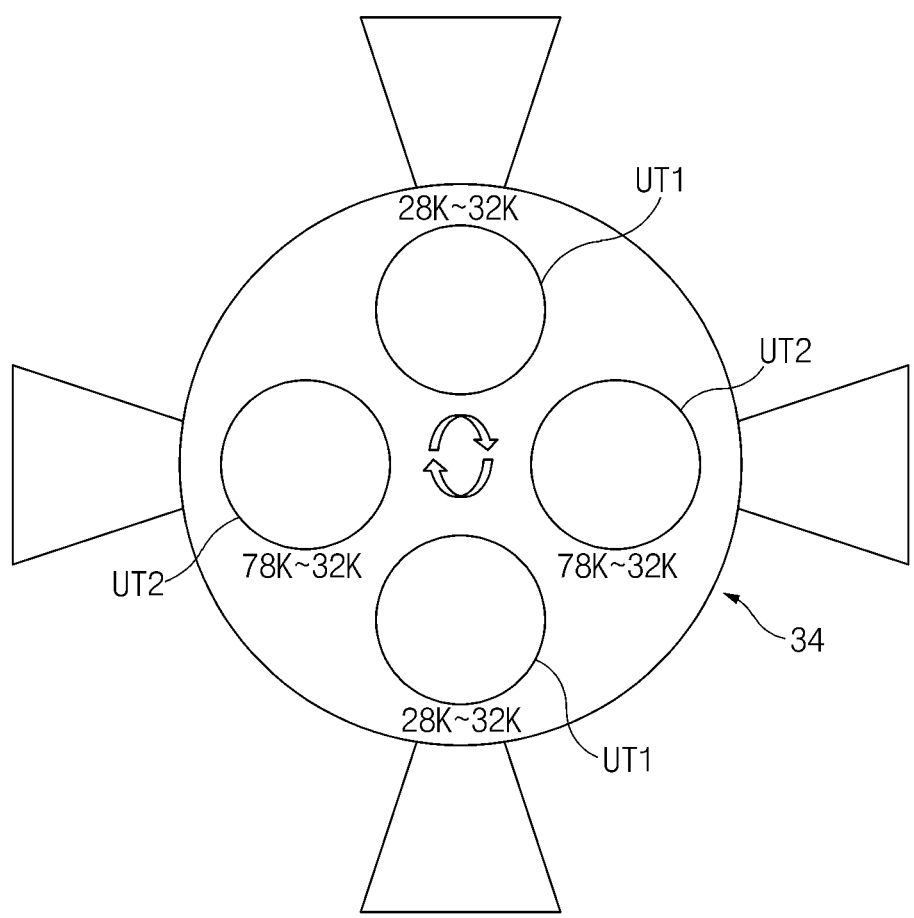
FIGS. 11 and 12 are drawings describing an embodiment of an ultrasonic vibrator.
Figure 12:
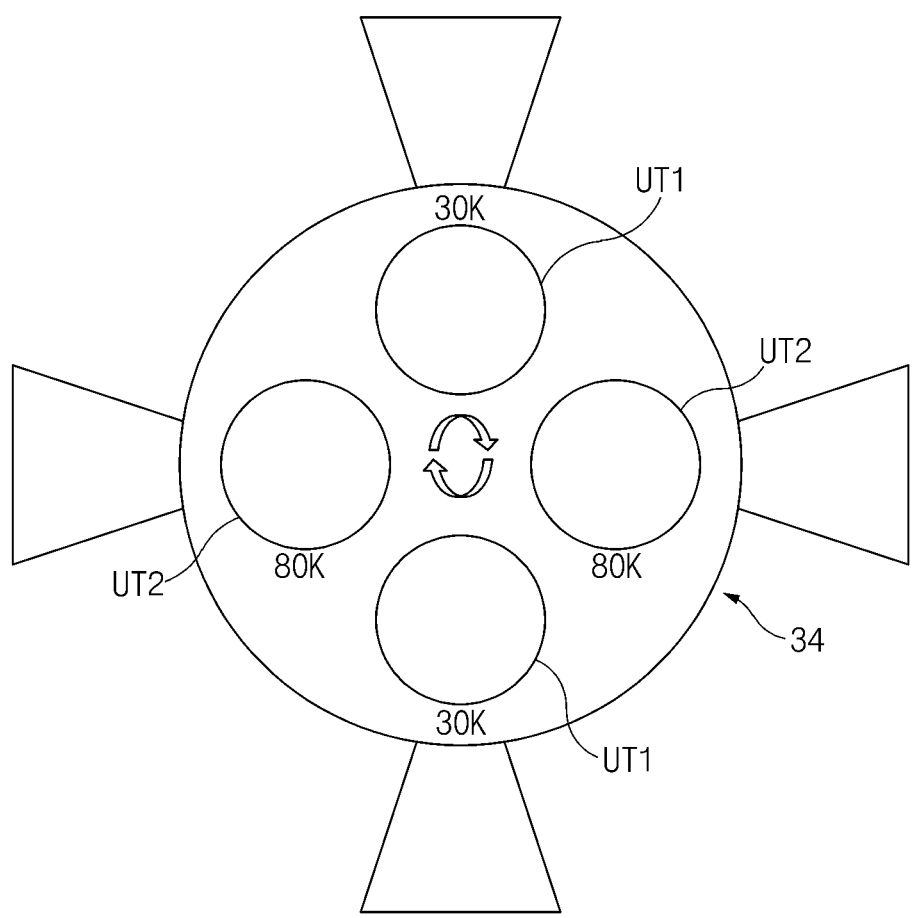

FIGS. 11 and 12 are drawings describing an embodiment of an ultrasonic vibrator.

Referring to FIG. 11, an ultrasonic vibrator UT of FIG. 5 may include a first ultrasonic vibrator UT1 for outputting a first frequency pattern and a second ultrasonic vibrator UT2 for outputting a second frequency pattern. The first ultrasonic vibrator UT1 and the second ultrasonic vibrator UT2 may output ultrasonic waves of patterns a frequency sweeps within a certain range.

According to an embodiment, the first ultrasonic vibrator UT1 may output an ultrasonic wave which sweeps a range of 28 KHz to 32 KHz. Furthermore, the second ultrasonic vibrator UT2 may output an ultrasonic wave which sweeps a range of 78 KHz to 82 KHz.

Referring to FIG. 12, the ultrasonic vibrator UT may include a first ultrasonic vibrator UT1 for outputting a first frequency pattern and a second ultrasonic vibrator UT2 for outputting a second frequency pattern. The first ultrasonic vibrator UT1 and the second ultrasonic vibrator UT2 may output ultrasonic waves, each of which has a certain frequency.

According to an embodiment, the first ultrasonic vibrator UT1 may output an ultrasonic wave having a frequency of 30 KHz. Furthermore, the second ultrasonic vibrator UT2 may output an ultrasonic wave having a frequency of 80 KHz.

Figure 13:
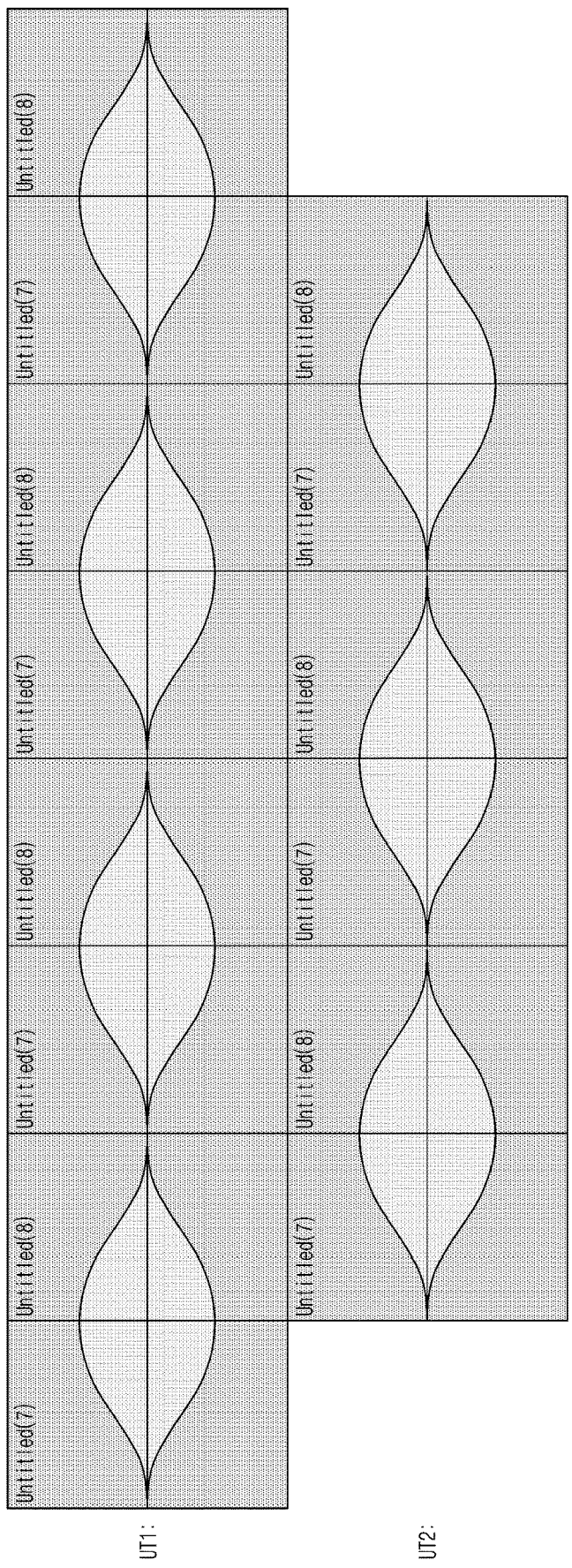
FIG. 13 is a drawing illustrating output patterns of a first ultrasonic vibrator and a second ultrasonic vibrator.

FIG. 13 is a drawing illustrating output patterns of a first ultrasonic vibrator and a second ultrasonic vibrator. FIG. 13 may be output patterns of ultrasonic vibrators shown in FIG. 12. Thus, a first ultrasonic vibrator UT1 may output an ultrasonic wave of 39 KHz and a second ultrasonic vibrator UT2 may output an ultrasonic wave of 80 KHz.

Referring to FIG. 13, a first frequency pattern output by the first ultrasonic vibrator UT1 and a second frequency pattern output by the second ultrasonic vibrator UT2 may be output to have different phases. According to an embodiment, phases of the first frequency pattern output by the first ultrasonic vibrator UT1 and the second frequency pattern output by the second ultrasonic vibrator UT2 may be set such that a ¼ period is delayed. In other words, the phases of the first frequency pattern and the second frequency pattern may be set such that the amplitude of the second frequency pattern is output to be largest at a point where the amplitude of the first frequency pattern is lowest, thus increasing a mosquito repelling effect. The first frequency pattern and the second frequency pattern may be set a smooth fade in/out scheme.

Figure 14:
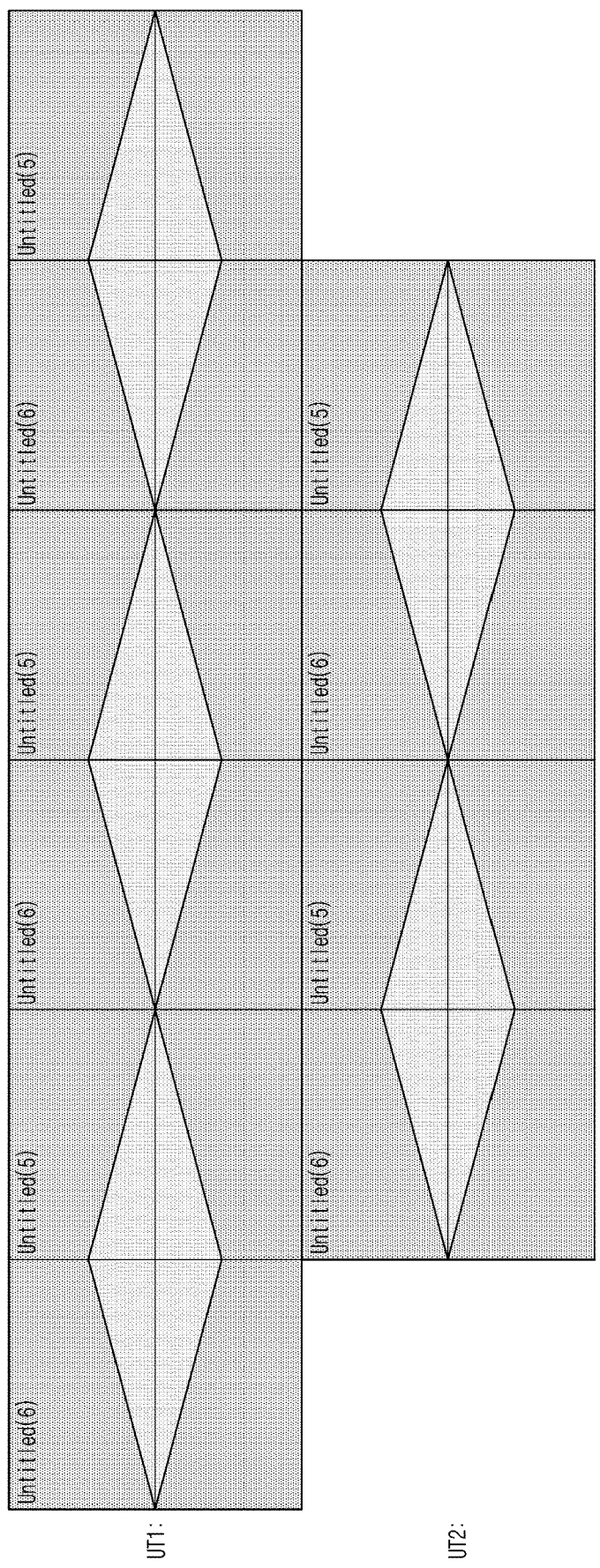
FIG. 14 is a flowchart illustrating a control method of an ultrasonic generator according to an embodiment of the present disclosure.

FIG. 14 is a flowchart illustrating a control method of an ultrasonic generator according to an embodiment of the present disclosure. Particularly, FIG. 14 describes a control method of an ultrasonic generator loaded into a vehicle.

A description will be given of the control method of the ultrasonic generator according to an embodiment of the present disclosure with reference to FIG. 14.

In S1601, an ultrasonic sensor SU of FIG. 1 may sense a mosquito in the vehicle.

In S1602, an ultrasonic generator 100 of FIG. 1 may transmit a primary ultrasonic wave.

The primary ultrasonic wave may be to apply an impact to a mosquito using resonance. To this end, a controller 163 of FIG. 5 may output an ultrasonic wave by means of ultrasonic vibrators UT1 and UT2. The controller 163 may operate at least one of the first ultrasonic vibrator UT1 or the second ultrasonic vibrator UT2.

In S1603, the controller 163 may open a first window for repelling a mosquito.

According to an embodiment, the first window may be set with regard to a location of a passenger. The location of the passenger may be identified by means of the ultrasonic sensor SU. Furthermore, the location of the passenger may be identified by means of a monitoring means in the vehicle. For example, the location of the passenger may be identified based on a pressure sensor located in a seat in the vehicle. Alternatively, the location of the passenger may be identified by means of a camera which captures the interior of the vehicle.

According to another embodiment, the first window may be set with regard to a location of a mosquito. For example, the controller 163 may select a window closest to the location of the mosquito as the first window.

Figure 15:
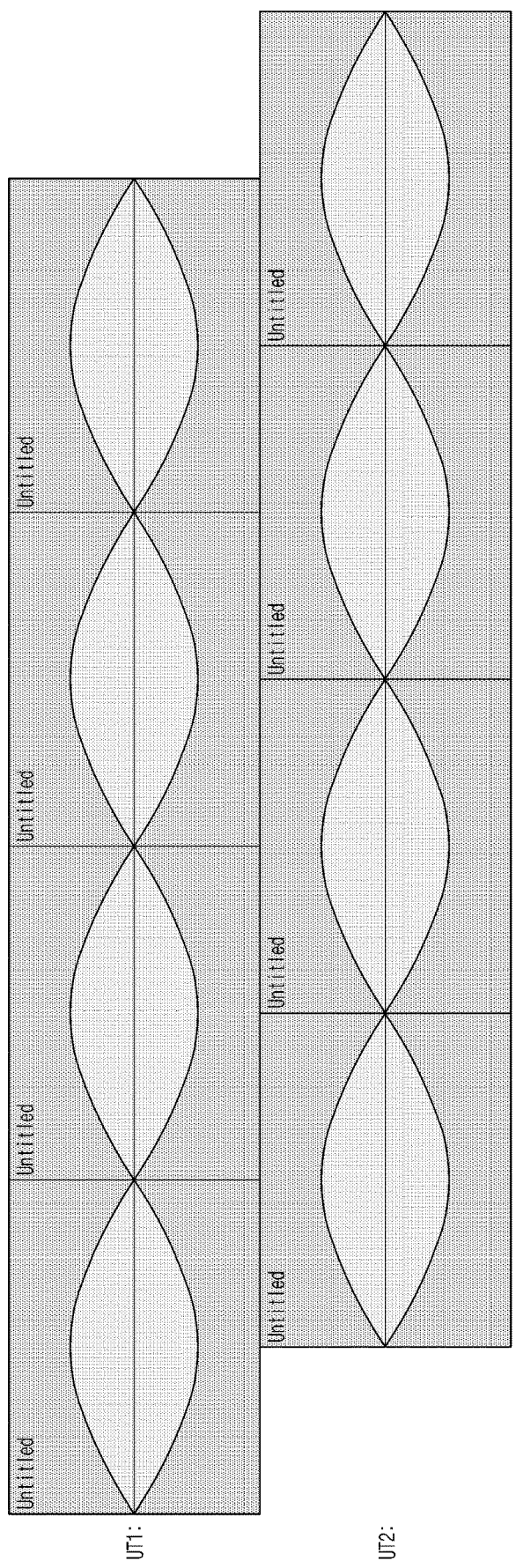
FIG. 15 is a flowchart describing a method for detecting a mosquito using an ultrasonic sensor.

FIG. 15 is a flowchart describing a method for detecting a mosquito using an ultrasonic sensor.

Referring to FIG. 15, in 51701, an ultrasonic sensor SU of FIG. 1 may transmit an ultrasonic signal for sensing.

In 51702, the ultrasonic sensor SU may identify a pattern of a reflection signal in which the ultrasonic signal for sensing is reflected from a target.

In 51703, the ultrasonic sensor SU may identify whether the pattern of the reflection signal corresponds to a mosquito sound.

When the pattern of the reflection signal corresponds to the mosquito sound, in S1704, the ultrasonic sensor SU may determine that the target corresponds to a mosquito.

Furthermore, the ultrasonic sensor SU may determine a location of the mosquito. When the target is the mosquito in S1704, the ultrasonic sensor SU may determine that the location of the target.

Figure 16:
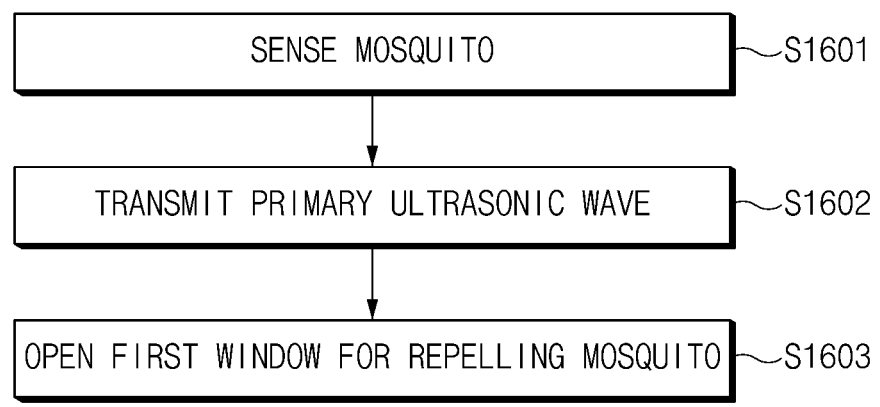
FIG. 16 is a drawing describing a method for determining a location of a mosquito in an ultrasonic sensor.

FIG. 16 is a drawing describing a method for determining a location of a mosquito in an ultrasonic sensor.

Referring to FIG. 16, an ultrasonic sensor SU of FIG. 1 may determine a place where a mosquito is located on a plane of a vehicle. The plane of the vehicle may be a plane horizontal with a road surface. The ultrasonic sensor SU may determine a location of the mosquito to determine whether the mosquito is closed to any window. For example, when the mosquito is located in area A1, the ultrasonic sensor SU may determine window W1 as a window closest to the mosquito.

According to another embodiment, the ultrasonic sensor SU may determine only two-dimensional (2D) location information of the mosquito on the plane. The ultrasonic sensor SU may transmit the 2D location information of the mosquito to a controller 163 of an ultrasonic generator 100 of FIG. 1. The controller 163 may determine whether the mosquito belongs to any of areas A1 to A4 and which window is closest to the mosquito, based on the 2D location information.

Figure 17:
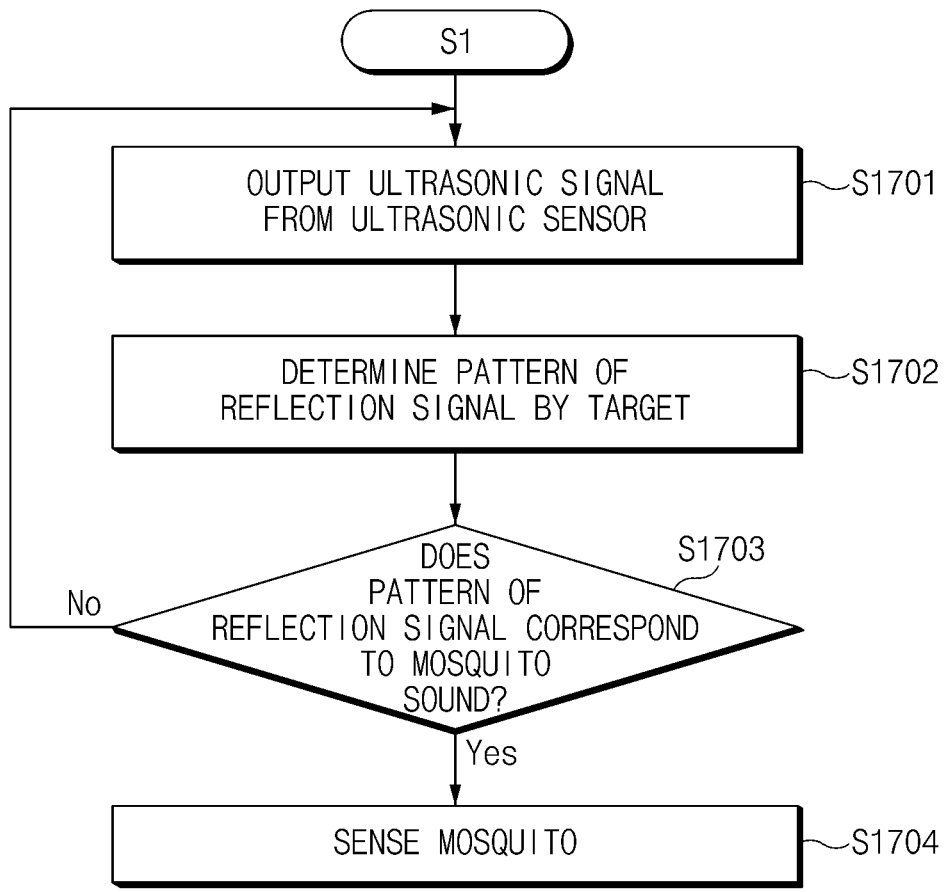
FIG. 17 is a flowchart describing a procedure of opening a first window.

FIG. 17 is a flowchart describing a procedure of opening a first window.

Referring to FIGS. 17, 19, 20, and 21 the procedure of opening the first window may be a procedure after transmitting a primary ultrasonic wave shown in FIG. 14.

In operation S1901, a controller 163 of FIG. 5 may determine a location of a mosquito. The controller 163 may determine whether the mosquito is present at any location on the plane of the vehicle.

In S1902, the controller 163 may determine a first window for repelling the mosquito based on the location of the mosquito. The controller 163 may select a window closest to the location of the mosquito as the first window. For example, when the location of the mosquito is determined as area A1 in FIG. 16, the controller 163 may select window W1 as the first window. Alternatively, the controller 163 may select window W2 as the first window, when the location of the mosquito is determined as area A2, may select window W3 as the first window, when the location of the mosquito is determined as area A3, and may select window W4 as the first window, when the location of the mosquito is determined as area A4.

In S1903, the controller 163 may determine whether the location of the mosquito is present within a threshold distance from the first window. The threshold distance may be determined as a distance, for example, about 15 cm where a mosquito may be easily repelled through a window.

When the location of the mosquito is less than the threshold distance from the first window, in S1904, the controller 163 may open the first window. When the first window is opened, there may be a very high possibility that the mosquito to which an impact is applied by the primary ultrasonic wave will be repelled out of the vehicle through the first window.

When the location of the mosquito is greater than the threshold distance from the first window, in S1905, the controller 163 may open a second window in a state where the first window is not opened. The opening of the second window may be a procedure for guiding outer air to drive the mosquito to the first window. To this end, the controller 163 may select a window located in a direction opposite to the first window with respect to the mosquito as the second window. For example, when the mosquito is located in area A2, the first window may be selected as window W2 and the second window may be selected as window W1.

After opening the second window, in S1906, the controller 163 may transmit a secondary ultrasonic wave. The mosquito may be pushed to an edge of the interior of the vehicle by air introduced from the outside through the second window. Next, when the secondary ultrasonic wave is transmitted, there may be a high possibility that the mosquito will receive an impact and will find refuge.

After S1906, the controller 163 may determine the location of the mosquito again in S1901 and may determine the first window. When entering S1901 after S1906, in S1905, the mosquito may be pushed to an edge of the interior of the vehicle by air from introduced from the outside through the second window. Thus, a possibility that the location of the mosquito will be less than the threshold distance from the first window may become high in S1903. Thus, the controller 163 may repel the mosquito out of the vehicle in S1904.

Figure 18:
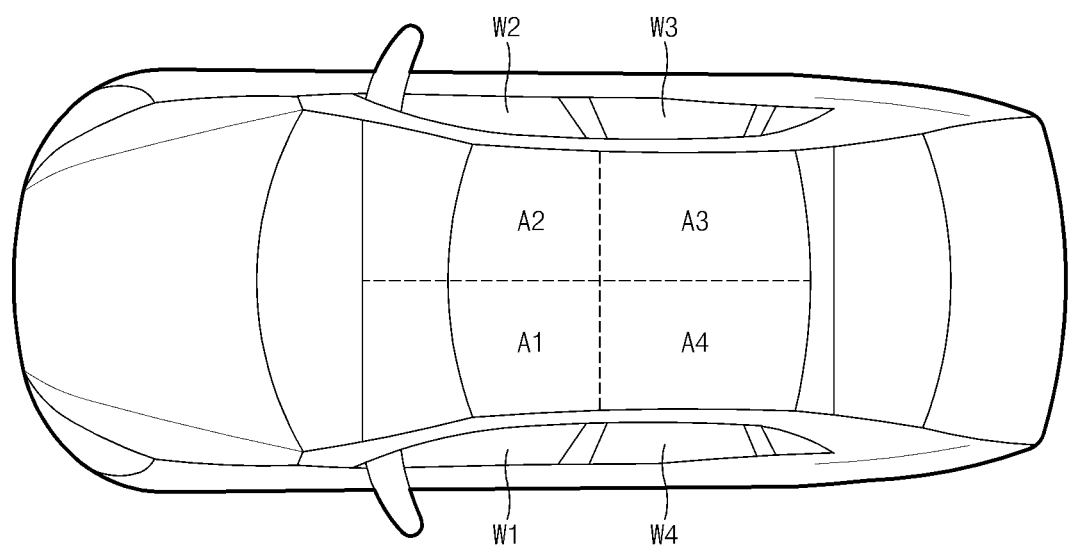
FIG. 18 is an illustration of a vehicle.
Figure 19:
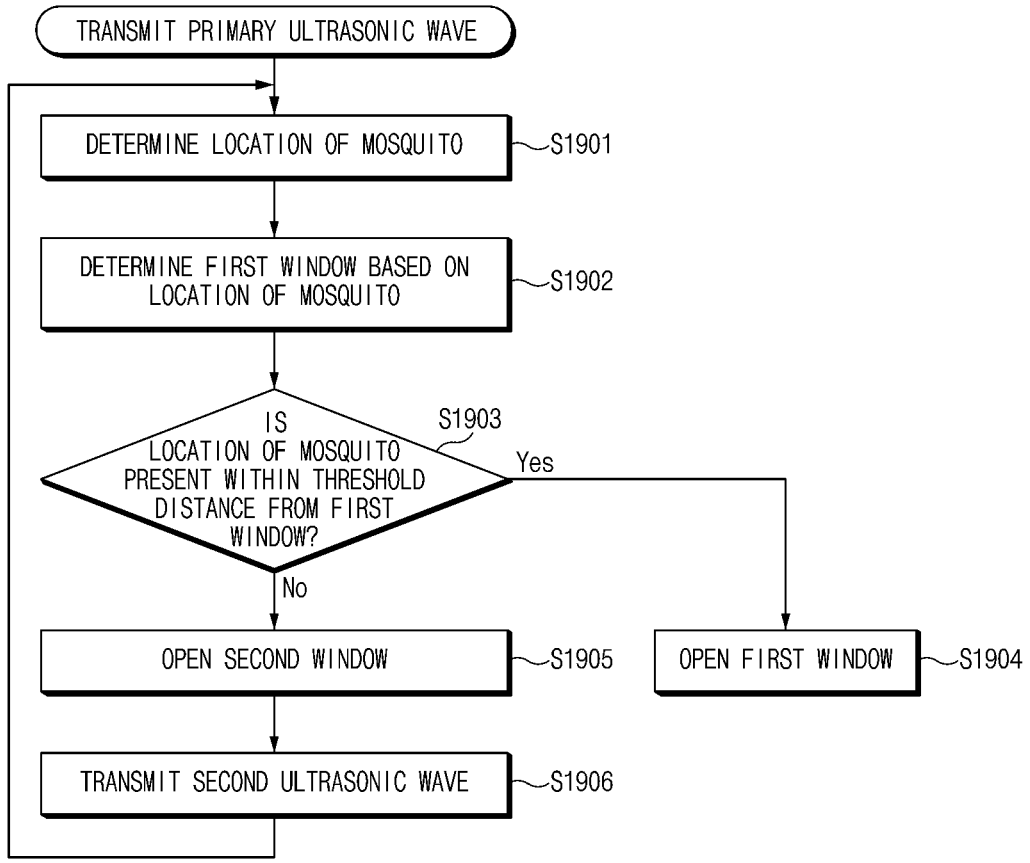
FIG. 19 is a flowchart describing a method for repelling a mosquito in a vehicle using an ultrasonic generator according to another embodiment of the present disclosure.
Figure 20:
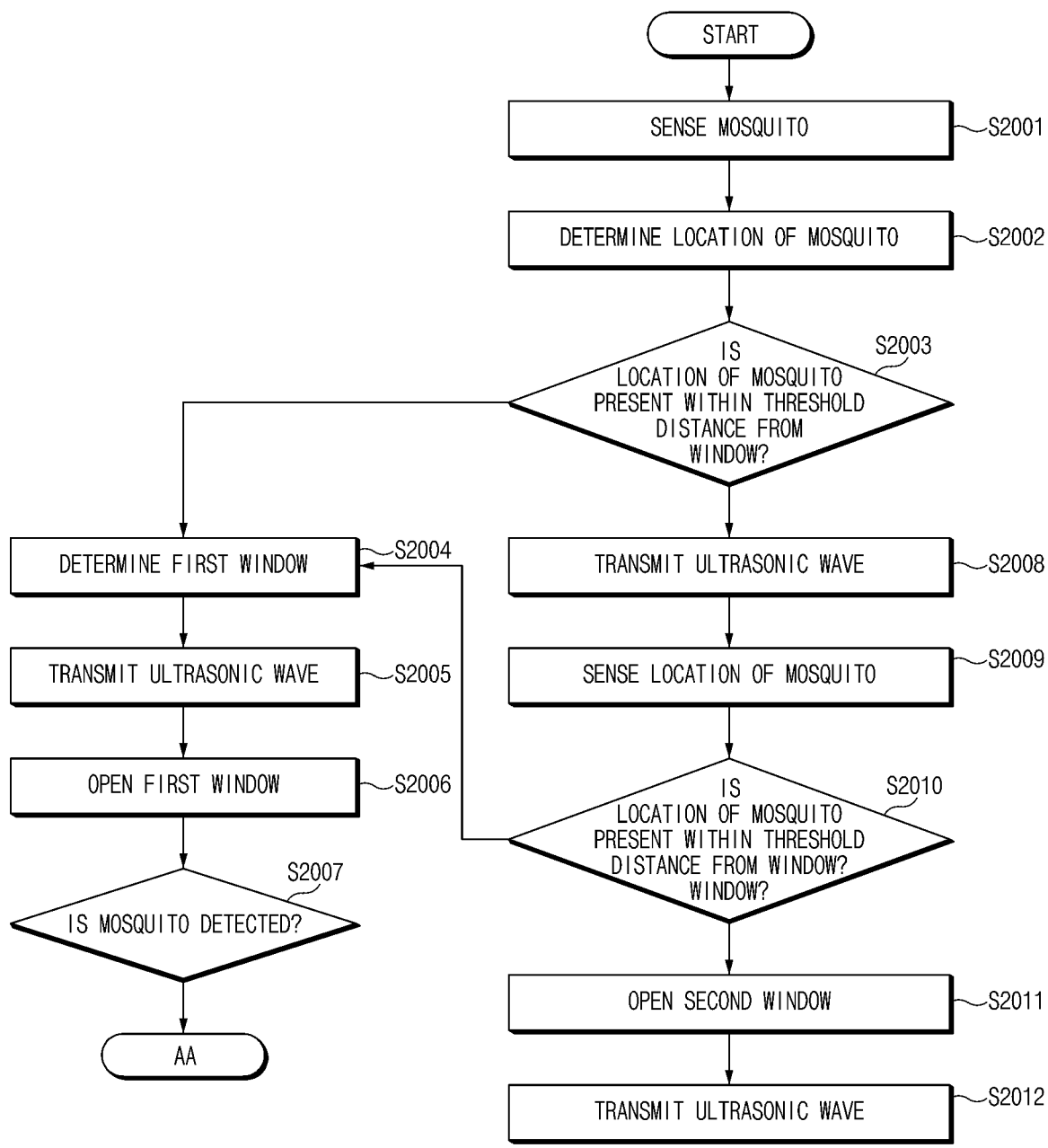
FIG. 20 is a flowchart describing a method for repelling a mosquito in a vehicle using an ultrasonic generator according to another embodiment of the present disclosure.

FIG. 18 is a flowchart describing a method for repelling a mosquito in a vehicle using an ultrasonic generator according to another embodiment of the present disclosure.

A description will be given of a method for repelling a mosquito in a vehicle using an ultrasonic generator according to another embodiment with referring to FIG. 18.

In S2001, an ultrasonic sensor SU of FIG. 1 may sense a mosquito. According to an embodiment, the ultrasonic sensor SU may transmit an ultrasonic wave and may determine a mosquito based on a reflection signal reflected from a target.

In S2002, the ultrasonic sensor SU may determine a location of the mosquito. The ultrasonic sensor SU may determine the location of the mosquito on a plane, based on a separation distance and a direction of the mosquito.

The ultrasonic sensor SU may transmit the location of the mosquito to a controller 163 of an ultrasonic generator 100 of FIG. 1.

In S2003, the controller 163 may determine whether the location of the mosquito is present within a threshold distance from a window. The window which is a criterion of determining the location of the mosquito may be a window closest to the location of the mosquito. The threshold distance may be predetermined and may be set to such a degree that the mosquito may be easily repelled by the transmission of an ultrasonic wave. According to an embodiment, the threshold distance may be set to about 15 cm.

When the location of the mosquito is less than the threshold distance from the window, in S2004, the controller 163 may determine the window as a first window. In other words, the controller 163 may determine the window, which is located within the threshold distance from the location of the mosquito, as the first window.

In S2005, the controller 163 may transmit an ultrasonic wave by means of an ultrasonic vibrator UT of FIG. 5.

In S2006, the controller 163 may open the first window. To this end, the controller 163 may generate a first window control signal. The first window control signal may be a control signal capable of directly opening the first window.

Alternatively, the first window control signal may be provided to a control module which controls a driving device of the vehicle. The control module may control the first window to be opened.

After transmitting the ultrasonic wave, in S2007, the controller 163 may determine whether the mosquito is detected in the vehicle. To this end, the controller 163 may operate the ultrasonic sensor SU. As described above, the ultrasonic sensor SU may sense whether there is a mosquito in the vehicle.

When the mosquito is not sensed in the vehicle, the operation of the ultrasonic generator 100 may be ended.

Alternatively, when the mosquito is still sensed in the vehicle, the ultrasonic generator 100 may repeat S2005.

When the location of the mosquito is greater than the threshold distance from the window, in S2008, the controller 163 may transmit ultrasonic waves by means of ultrasonic vibrators UT1 and UT2.

In S2009, the controller 163 may detect a location of the mosquito again. There may be a high possibility that mosquitoes will be impacted and moved by the ultrasonic waves in S2008. Thus, the controller 163 may determine whether mosquitoes are close to the window. To this end, the controller 163 may operate the ultrasonic sensor SU.

In S2010, the controller 163 may determine whether the location of the mosquito is present within the threshold distance from the window.

When the location of the mosquito is present within the threshold distance from the window, the controller 163 may proceed with S2004.

When the location of the mosquito is present within the threshold distance from the window, in S2011, the controller 163 may open a second window. The second window may be selected among windows except for a window closest to the mosquito. The second window may be to drive the mosquito to the window through outer air, which may be selected among windows located in a direction opposite to the window closest to the mosquito.

In S2012, the controller 163 may transmit an ultrasonic wave again. After repelling the mosquito to an area close to the window in S2011, the controller 163 may transmit an ultrasonic wave to apply a secondary impact to the mosquito.

Next, the controller 163 may proceed with S2009 again.

Figure 21:
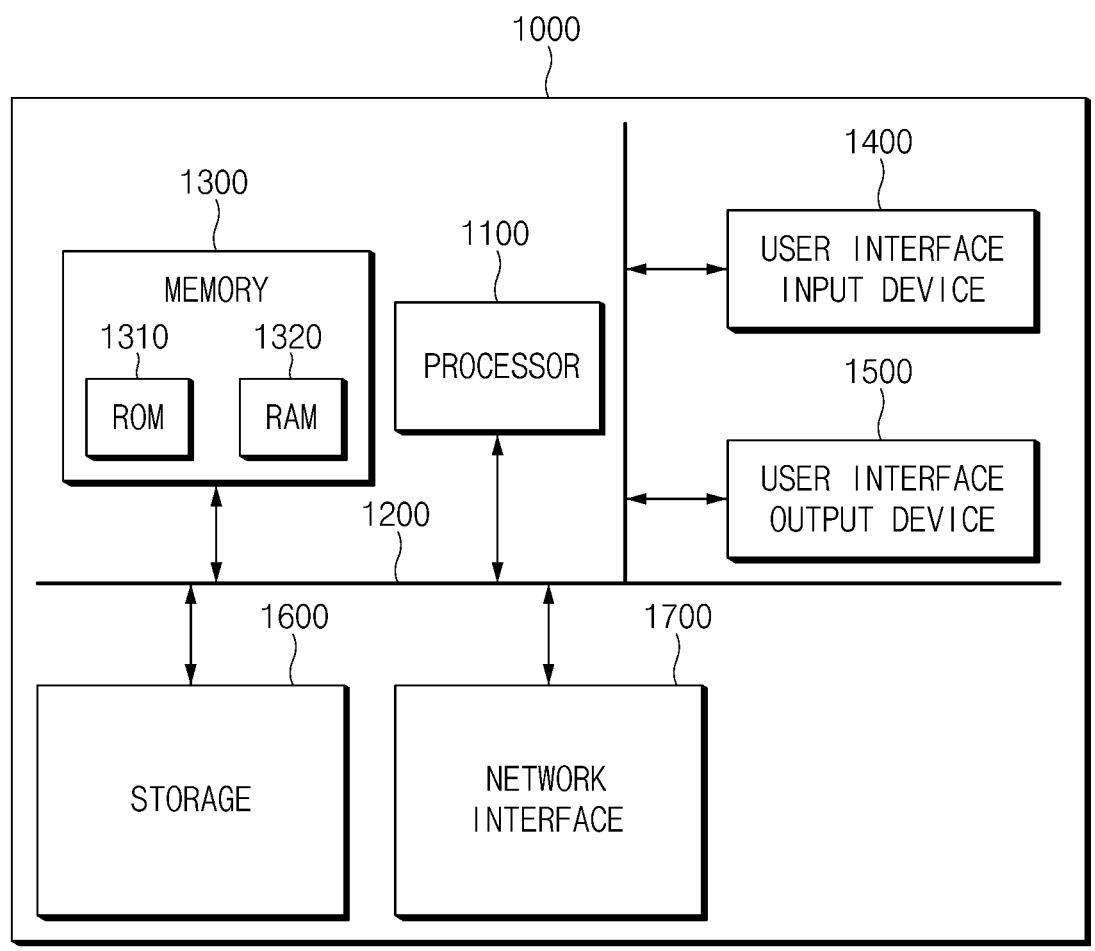
FIG. 21 is a block diagram illustrating a computing system according to an embodiment of the present disclosure.

FIG. 21 is a block diagram illustrating a computing system according to an embodiment of the present disclosure.

Referring to FIG. 21, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. Particularly, the processor 1100 may generate a control signal for controlling an ultrasonic generator 100 according to an embodiment of the present disclosure. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

According to an embodiment of the present disclosure, the ultrasonic generator may transmit an ultrasonic wave for repelling a mosquito and may open a window to repel the mosquito out of the vehicle, thus effectively repelling the mosquito out of the vehicle.

According to an embodiment of the present disclosure, the ultrasonic generator may rotate an ultrasonic vibrator, thus repelling mosquitoes in a wide area while reducing the number of ultrasonic vibrators.

Furthermore, according to an embodiment of the present disclosure, the ultrasonic generator may adjust a pattern of an ultrasonic output, thus increasing the performance of repelling mosquitoes.

In addition, various effects ascertained directly or indirectly through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. An ultrasonic generator for repelling a mosquito, which is sensed by a sensor, out of a vehicle, comprising:
   an ultrasonic vibrator device configured to output an ultrasonic signal for repelling the mosquito; and
   a controller configured to:
      control the ultrasonic vibrator device and control a first window, chosen among a plurality of windows of the vehicle, to be opened such that the mosquito is repelled out of the first window, and
      select the first window by excluding a window, chosen among the plurality of windows of the vehicle, closest to a location of a passenger of the vehicle.

2. The ultrasonic generator of claim 1, wherein the ultrasonic vibrator device includes:
   a first ultrasonic vibrator and a second ultrasonic vibrator configured to output ultrasonic waves having different frequencies.

3. The ultrasonic generator of claim 1, wherein the controller is further configured to control the ultrasonic vibrator device such that a frequency range output by the ultrasonic vibrator device is swept.

4. The ultrasonic generator of claim 1, further comprising:
   a motor configured to rotate the ultrasonic vibrator device if activated by the controller.

5. The ultrasonic generator of claim 1, wherein the controller is further configured to:
   select the first window based on which window of the plurality of the windows of the vehicle is closest to a location of the mosquito.

6. The ultrasonic generator of claim 5, wherein the controller is further configured to control a second window of the plurality of the windows of the vehicle to be opened if a distance between the mosquito and the first window is greater than or equal to a threshold distance.

7. The ultrasonic generator of claim 6, wherein the second window is located in a direction opposite to the first window.

8. The ultrasonic generator of claim 6, wherein the controller is further configured to control the ultrasonic vibrator device to transmit a secondary ultrasonic wave before opening the first window and after opening the second window.

9. The ultrasonic generator of claim 1, further comprising:
   a display configured to provide a notification of an operation state of the ultrasonic vibrator device.

10. The ultrasonic generator of claim 1, wherein the controller is further configured to control a speaker for in-vehicle use to output a sound source signal of a predetermined audible frequency while the ultrasonic vibrator device outputs an ultrasonic signal.

11. The ultrasonic generator of claim 1, wherein the controller is further configured to control a display in the vehicle to display a location of the mosquito sensed by the sensor device.

12. A method for repelling a mosquito, which is sensed by a sensor, in a vehicle, the method comprising:
    transmitting, by an ultrasonic vibrator device, a primary ultrasonic wave based on the sensing of the mosquito; and
    opening, by a controller, a first window, chosen among a plurality of windows of the vehicle, for repelling the mosquito out of the vehicle;
    wherein the opening of the first window further includes:
        determining, by the controller, a location of a passenger in the vehicle, and
        selecting, by the controller, the first window by excluding a window, chosen among the plurality of windows of the vehicle, closest to the location of the passenger.

13. The method of claim 12, wherein the opening of the first window step further includes:
    determining, by the controller, a location of the mosquito; and
    selecting, by the controller, the first window based on which window of the plurality of the windows of the vehicle is closest to the location of the mosquito.

14. The method of claim 13, wherein the opening of the first window step further includes:
    opening, by the controller, a second window of the plurality of the windows of the vehicle if a distance between the mosquito and the first window is greater than or equal to a threshold distance.

15. The method of claim 14, wherein the second window is located in a direction opposite to the first window.

16. The method of claim 14, further comprising:
    transmitting, by the controller, a secondary ultrasonic wave before opening the first window and after opening the second window.

* * * * *